US006964129B2

(12) United States Patent
Fenwick

(10) Patent No.: US 6,964,129 B2
(45) Date of Patent: Nov. 15, 2005

(54) MULTIFUNCTIONAL CONTAINER SYSTEM

(75) Inventor: Roy Fenwick, Scarborough (CA)

(73) Assignee: Dennison Associates, Toronto (CA)

( * ) Notice: Subject to any disclaimer, the term of this patent is extended or adjusted under 35 U.S.C. 154(b) by 2 days.

(21) Appl. No.: 10/475,926

(22) PCT Filed: Apr. 25, 2002

(86) PCT No.: PCT/CA02/00580

§ 371 (c)(1),
(2), (4) Date: Oct. 24, 2003

(87) PCT Pub. No.: WO02/087395

PCT Pub. Date: Nov. 7, 2002

(65) Prior Publication Data

US 2004/0134124 A1    Jul. 15, 2004

(30) Foreign Application Priority Data

Apr. 25, 2001 (CA) .................................. 2345160

(51) Int. Cl.[7] .............................................. A01G 9/02
(52) U.S. Cl. ........................................ 47/66.1; 47/66.6
(58) Field of Search ............................. 47/66.1, 66.3, 47/66.4, 66.6, 65.5

(56) References Cited

U.S. PATENT DOCUMENTS

| 1,499,473 | A | * | 7/1924 | Price .............................. 47/67 |
| 3,747,268 | A | * | 7/1973 | Linder ............................ 47/67 |
| D278,521 | S |   | 4/1985 | Baird et al. |
| 4,597,221 | A |   | 7/1986 | Adair et al. |
| 4,847,741 | A |   | 7/1989 | Boettinger |
| D383,417 | S |   | 9/1997 | Davis |
| D393,816 | S |   | 4/1998 | Conner |
| D405,027 | S |   | 2/1999 | McElwain et al. |
| D409,520 | S |   | 5/1999 | Conner |
| 5,960,587 | A | * | 10/1999 | Brasseur et al. ............... 47/86 |
| 5,967,359 | A |   | 10/1999 | Mindell |
| D416,214 | S |   | 11/1999 | Conner |
| 6,085,459 | A | * | 7/2000 | Conner ....................... 47/41.01 |
| 6,161,333 | A |   | 12/2000 | Poston |
| 2002/0134017 | A1 | * | 9/2002 | Gibbs ........................... 47/86 |

FOREIGN PATENT DOCUMENTS

| JP | 408214702 A | * | 8/1996 | ............ A01G 9/02 |
| JP | 11341924 A | * | 12/1999 | ............ A01G 9/02 |

* cited by examiner

Primary Examiner—Son T. Nguyen

(74) Attorney, Agent, or Firm—Volpe and Koenig, P.C.

(57) ABSTRACT

The present invention relates to a multifunctional container (1) comprising two container sections (3, 4), each having a base (5) and at least two side walls (8, 9) to define an enclosed space (7) open at the top, one of said side walls (9) on each container section (3, 4) having magnetic means located on said side wall (9) of each of the container sections to permit the container sections to be easily joined and separated.

15 Claims, 6 Drawing Sheets

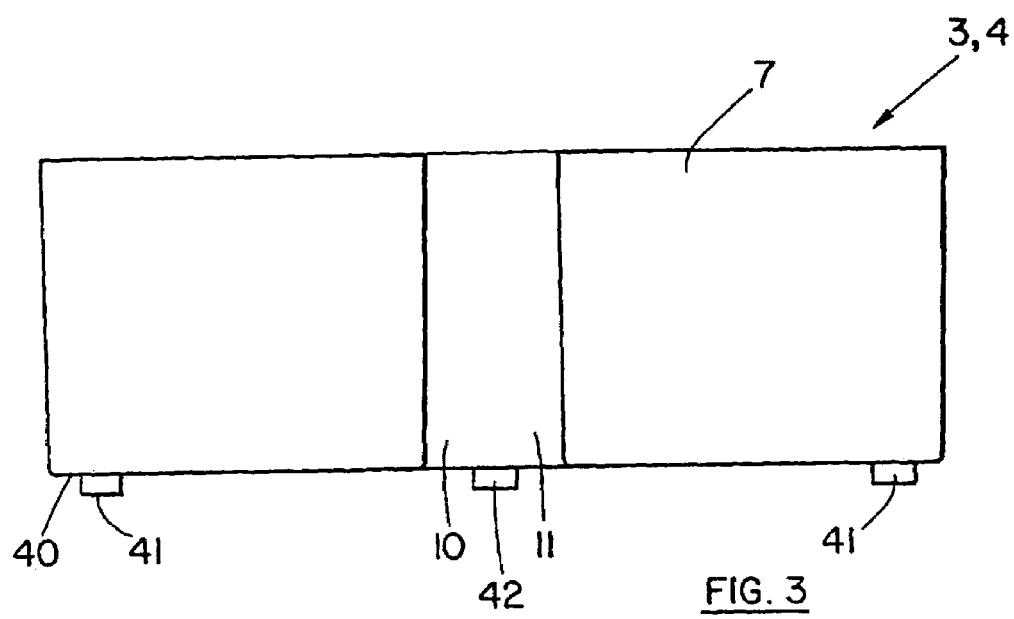
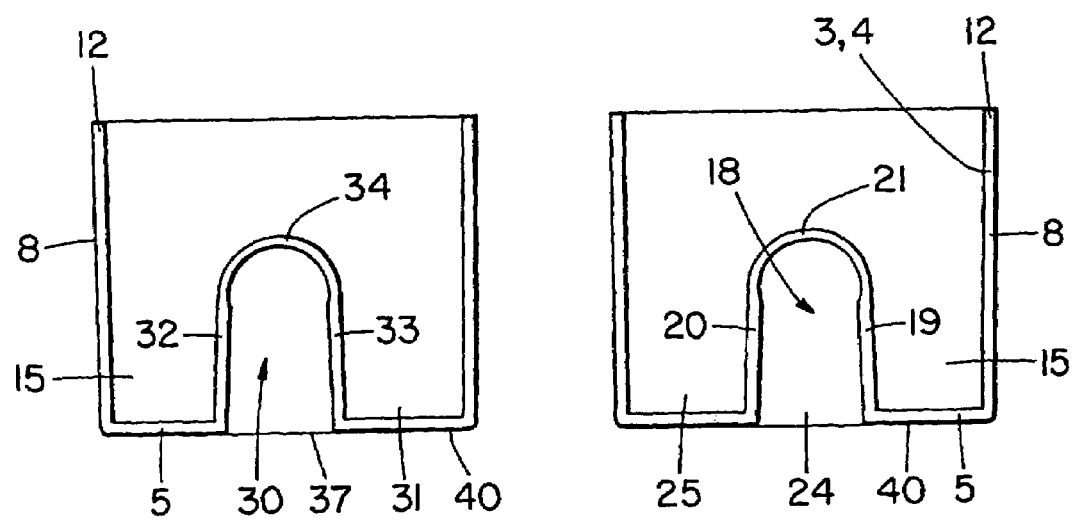

MULTIFUNCTIONAL CONTAINER SYSTEM

FIELD OF THE INVENTION

This invention relates to a multifunctional container system. In particular the present invention provides a container primarily designed to rest on a patio table encircling an umbrella pole but when the patio table umbrella is not in place additional features are provided to hold the container on the table thus preventing it from being inadvertently knocked or blown off the table.

BACKGROUND OF THE INVENTION

Generally, patio tables may be found on patios or terraces in many locales including residential backyards, hotels, resorts and restaurants. The patio table may take a number of shapes including rectangular, round and square. By design the patio table provides for a hole in its centre which allows for the pole of an umbrella to protrude upward from its base; the umbrella awning providing shade from the sun's rays or as decoration to the area.

Unfortunately, the umbrella pole makes it very difficult to place a floral centerpiece on the patio table. Therefore it would be advantageous to have a flower pot system or planter with a central passageway, which would allow the pole to pass through. Further, it would be a benefit if the flower pot system could be removed and replaced for maintenance or for other reasons (e.g. another type or flower or flower colour) without-removing the patio umbrella pole. The ease of removal and replacement of the flower pot is important to avoid spillage of the pot's contents in order to maintain the cleanliness of the patio table as it is primarily designed for the social interaction of individuals consuming food and beverages. Further, the ease of separation and joining is also a benefit when one considers the weight of flower pots with earth or planter mix and their awkwardness to grasp.

Existing prior art has identified the need to provide a flower pot or planter, which can be centred on a patio table by encircling the pole when it is in place and also the need to be able to separate and join the flower pot halves without removing the umbrella pole.

U.S. Pat. No. 5,960,587 shows a planter adapted for circling an umbrella pole and resting upon a patio table top. The planter includes a large pot divided into two halves of identical geometry, and a drip tray similarly divided into two halves of identical geometry. Features are provided to lock each drip tray half into a corresponding pot half. A dovetail system allows each pot half to interlock to the other, thereby forming a complete planter. The planter halves are separable by lifting one half relative to the other to disengage the dovetail interlock.

Numerous other patents describe a similar concept but utilizing different shapes and methods of connection including U.S. Pat. Nos 1,499,473; 4,847,741; 4,597,221; 3,747; 268; 5,967,359; 6,085,459; and U.S. Design Patent Nos: Des 278,521; Des. 383,417; Des 393,816; Des 405,027; Des 409,520 and Des 416,214.

Although the prior art addresses and meets the basic requirements to enable a flower pot comprised of two separable halves to encircle an umbrella pole in the centre of a patio table without removing the umbrella pole, the art has not adequately addressed the requirement for easy separation and joining given the nature of the product. Specifically prior art showing a flower pot comprised of two separable halves joined by male/female interfaces or other means such as having to place one piece inside another requires the user to have the dexterity to be able to complete this function which could be made very difficult by the weight and awkwardness of the pots and the size of the male/female interfaces being brought together. Further, depending on the design of the joining mechanisms their function would be rendered almost completely ineffective if any dirt or debris interferes with them.

Further, although existing prior art has addressed the need to centre a pot around the umbrella pole, it has not addressed the need to retain the flower pot at the centre of the table when the pole is not in place.

Further, existing prior art has not envisioned a separable patio table flower pot system, which can be used as a multi-functional unit.

SUMMARY OF THE INVENTION

It is a further object of the invention to provide a multifunctional container system whereby separate halves of the container can be 'easily' joined and separated by magnet means.

It is a further object of the invention to provide a multifunctional container adapted for placement and removal at the centre of a patio table encircling an umbrella pole without removing the pole.

It is a further object of the invention in a preferred embodiment to provide a multifunctional container system having means to stabilize the container at the centre of the patio table thereby preventing it from being inadvertently knocked or blown off the table when the umbrella pole is not in place.

It is a further object of the invention to provide a multifunctional container system which provides for the two halves of the container to stand alone and to be able to rest unencumbered flat against an object, for example a room wall, or be supported up against a vertical surface, such as a fence, through the use of fasteners.

It is a further object of the invention to provide a multifunctional container system, which provides for the two halves of the container to be joined and strung as a 'hanging pot' from a hanger on a wall or fence Thus in accordance with the present invention there is provided a multifunctional container comprising two container sections, each having a base and at least two side walls to define an enclosed space open at the top, one of said side walls on each container section having magnetic means located on or in said side wall of each of the container sections to permit the container sections to be easily joined and separated. In a preferred embodiment, each of said container sections has at least one generally planar wall having an indent section, which forms a vertical passageway when the container sections are joined. The indent section is preferably centered on said planar wall and has a semicircular cross section to form an umbrella passageway between adjoining container sections.

In an other aspect the present invention provides a center piece to hold together container sections adapted to fit around an umbrella or like pole, said center piece consisting of a cap and a longitudinal depending section, said cap adapted to cover the umbrella passageway between adjoining container sections. In a preferred embodiment the longitudinal depending section consists of a tubular member with a diameter slightly less than that of the patio table centre hole.

Further features of the invention will be described or will become apparent in the course of the following detailed description.

BRIEF DESCRIPTION OF THE DRAWINGS

Preferred embodiments of the invention are shown in the drawings, wherein:

FIG. 3 is a front plan view of the container section of FIG. 2;

FIG. 4 is a is a cross section of the container section of FIG. 2 through line 4—4;

DETAILED DESCRIPTION OF THE PREFERRED EMBODIMENTS

Figure 1:
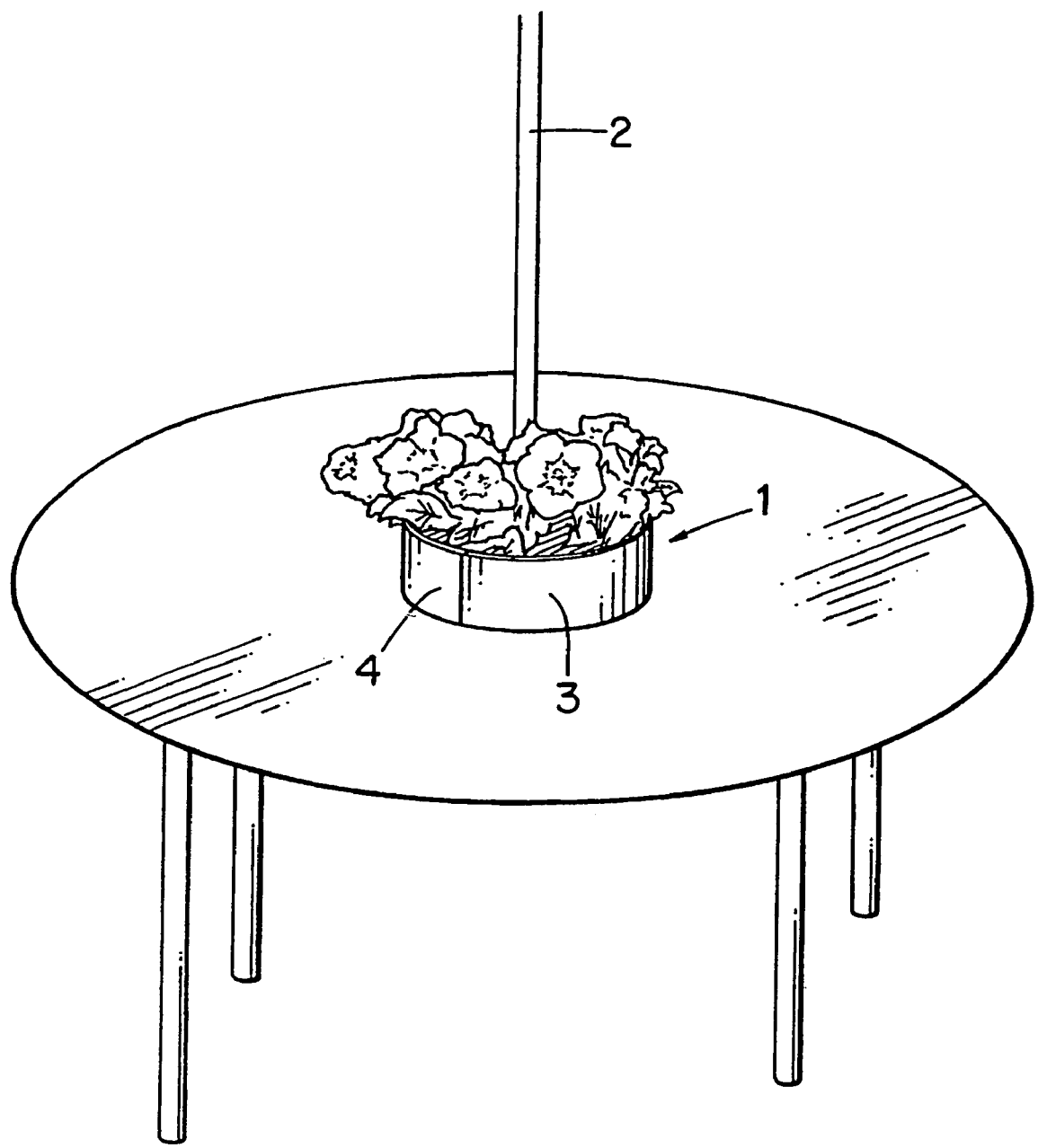
FIG. 1 is a perspective view of an embodiment of the multi functional container system according to the present invention fully assembled and resting on a patio table encircling an umbrella pole.
Figure 2:
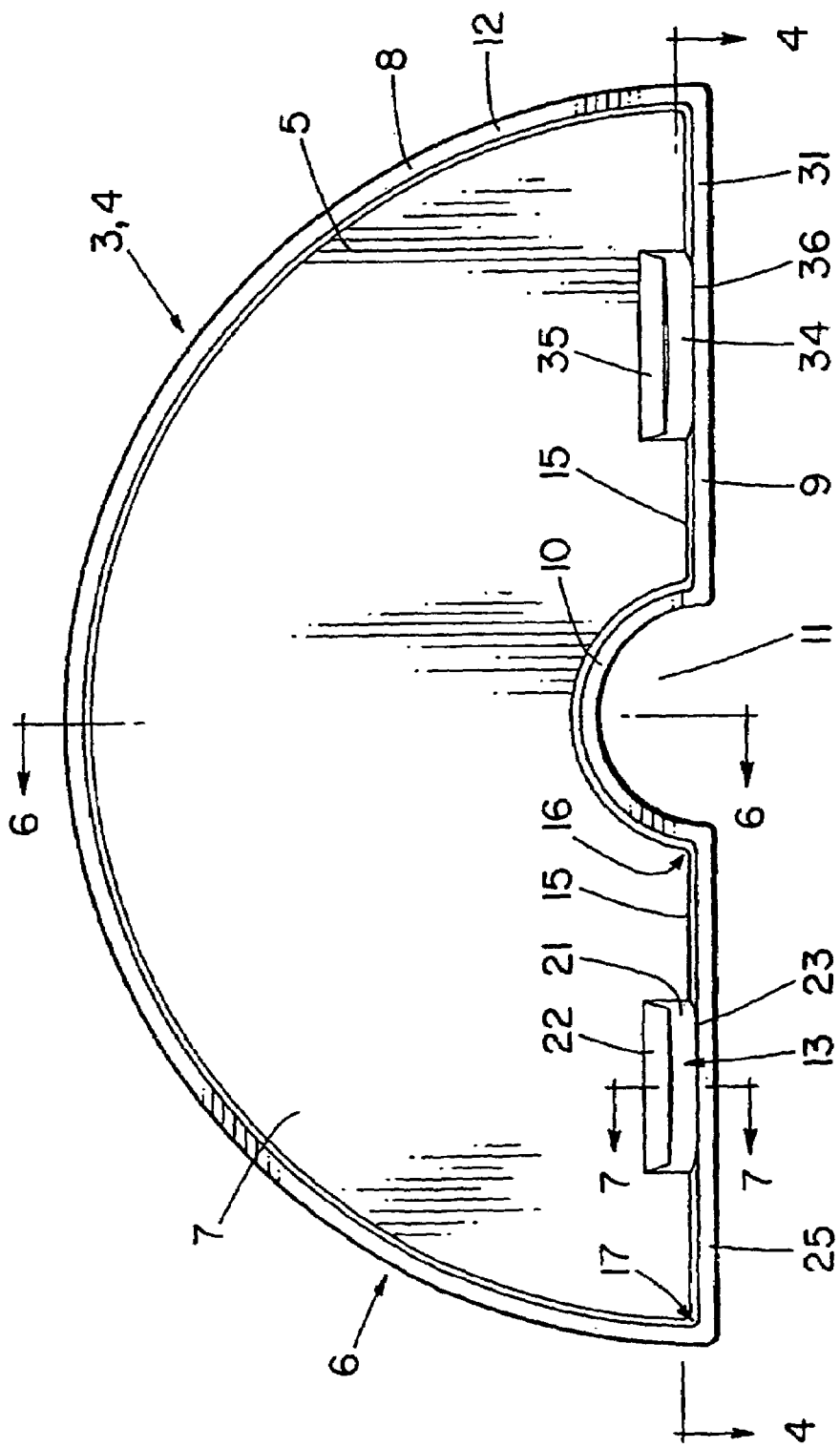
FIG. 2 is an enlarged top plan view of one of the two identical container sections of the multi functional container of FIG. 1.

Referring to the Figures, one embodiment of a multifunctional container according to the present invention is generally indicated at 1. In the embodiment illustrated the container is being used to hold dry flowers to create a floral center piece. The container can be used for planting real flowers or can be shaped to hold other items such as food, cutlery, condiments etc. All such applications fall within the scope of the present invention. FIG. 1 illustrates one embodiment of the multi functional container system fully assembled resting on a patio table encircling an umbrella pole 2. The multi functional container 1 has at least two container sections, preferably two identical container sections 3, 4, each having a base 5 and at least two side walls 6 to define an enclosed space 7 open at the top. In the embodiment illustrated the base 5 has a semi-circular configuration, a first curved wall 8 and a generally planar wall 9. The planar wall 9 has an indent section 10, which forms a passageway 11 when the container sections 3, 4 are joined. In the preferred embodiment the indent section 10 has a semi-circular cross section and is centered on planar wall 9. The passageway 11 is preferably sized to permit the container 1 to encircle a conventional umbrella pole 2 when the container sections 3, 4 are joined together. If the container 1 is to be used as a hanging pot, along the interior of the top edge 12 of the curved wall 8 hook connections (not shown) can be provided. The hook connections preferably would be spaced equidistant along the top edge 12 of curved wall 8. Utilizing a conventional wire hanger with ends attached to the hook connections the container 1 can be used as a hanging basket for flowers etc. In addition holes can be located in planar wall 9 to permit either or both of the container sections 3, 4 to be attached to a vertical surface such as a wall or fence utilizing a suitable fastener such as nails, screws, hooks or the like.

In the embodiment shown, the container sections 3, 4 are preferably formed of molded plastic, such as polypropylene, polystyrene, polyethylene or the like. The planar wall 9 has a preferred length of about 10 inches along its top edge and is inclined to base 5 at a slight angle (1.0° off the vertical). The planar wall 9 and side wall 8 both a height of 3.5 inches. The indent section 10 has a radius of about one inch. The wall thickness of the planar wall 9, side wall 8 and base 5 are 0.125 inches.

Figure 5:
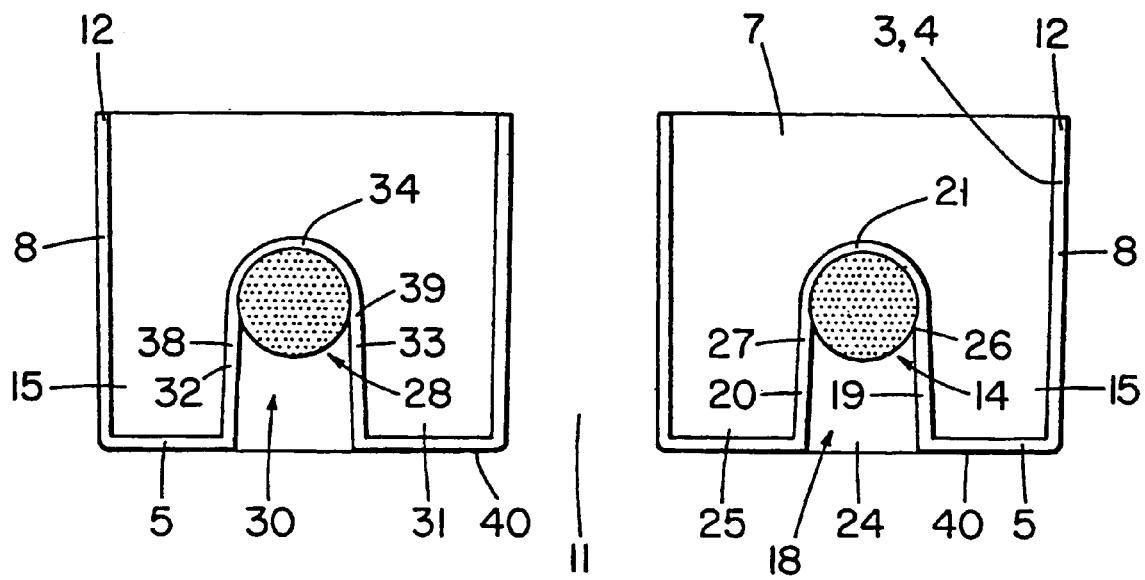
FIG. 5 is a is a cross section of the container section of FIG. 2 through line 4—4 with the magnet and slug inserted.

In order to permit the container sections 3, 4 to be easily joined and separated magnetic means, generally indicated at 13, are located on or in the planar wall 9 of each of the container sections 3, 4. The magnetic means 13 should provide sufficient magnetic attraction to retain the container sections together in an outdoor environment whether resting on a table or being used as a hanging basket yet still permit the container sections to be separated by the home owner. The magnetic means 13 can consist of magnetic powder incorporated within a plastic resin from which the container sections are preferably formed or magnets attached to the wall of the container sections. In the embodiment illustrated, as best shown in FIGS. 5 the magnetic means 13 comprises at least one magnet 14 secured to the inside surface 15 of planar wall 9 about half way between the base 5 and top edge 12 of the planar wall 9 and half way between the end 16 of the semi-circular indent section 10 and the point of connection 17 of the planar wall 9 and the curved wall 8. The magnetic means 13 does not require lifting one or both container sections relative to the other in order to join or separate the pot sections. Further the magnetic means 13 permits the container sections to be easily joined or separated regardless of whether the container sections are full or empty.

Figure 6:
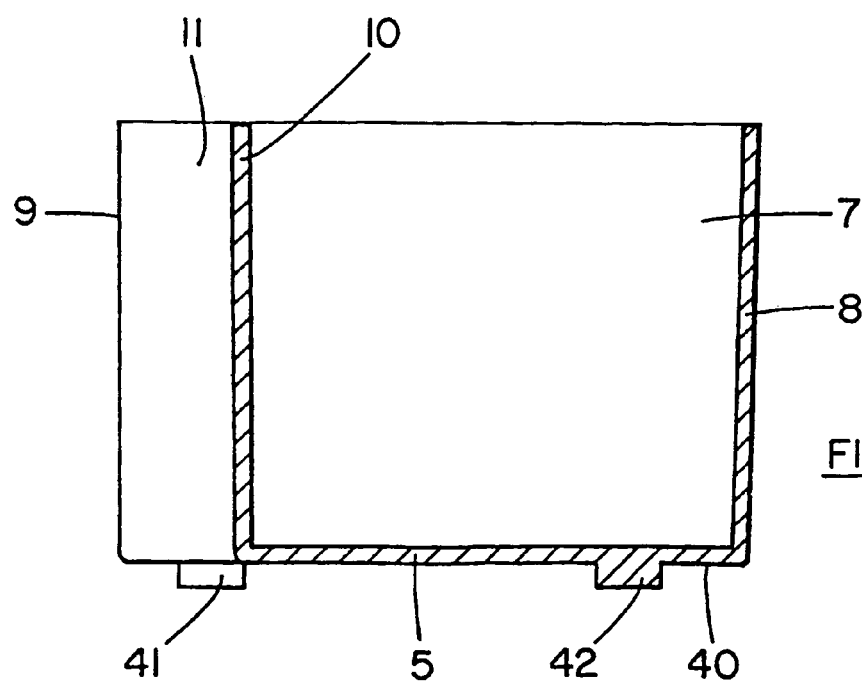
FIG. 6 is a is a cross section of the magnet slot in the container section of FIG. 2 through line 6—6.

In the embodiment shown, see FIGS. 4 to 6, magnet 14 is secured to the inside surface 15 of planar wall 9 by means of slot 18 in the section 25 of planar wall 9 to one side of indent section 10. Slot 18 has two opposing side walls 19, 20, an end wall 21 and back wall 22. The front wall 23 of slot 18 is provided by the adjacent portion of planar wall 9 of the container section 3, 4. The slot has an open end 24 in base 5 to permit insertion of the magnet 14. The magnet 14 is preferably a flat disk. The two opposing side walls 19, 20 of slot 18 converge from open end 24 towards end wall 21 at about a 5° angle from the vertical. The end wall, in the embodiment shown, is a circular segment slightly greater than a semi-circle having an inside radius of 0.500 inches. When the magnet 14 is inserted into slot 18, it snaps into place against end wall 24. The container section 3, 4 in the embodiment illustrated is preferably molded from a plastic material, preferably polystyrene. When the newly molded container sections are still "warm", the side walls 19, 20 of slot 18 are sufficiently flexible to permit magnet 14 to be inserted into slot 18 and snapped into place against end wall 21. The distance between the ends 26, 27 of end wall 21 is less than the diameter of magnet 14. As the container section "cools" there is some slight contraction further locking the magnet 14 in place. The open end 24 of slot 18 is preferably 1.098 inches wide.

Figure 7:
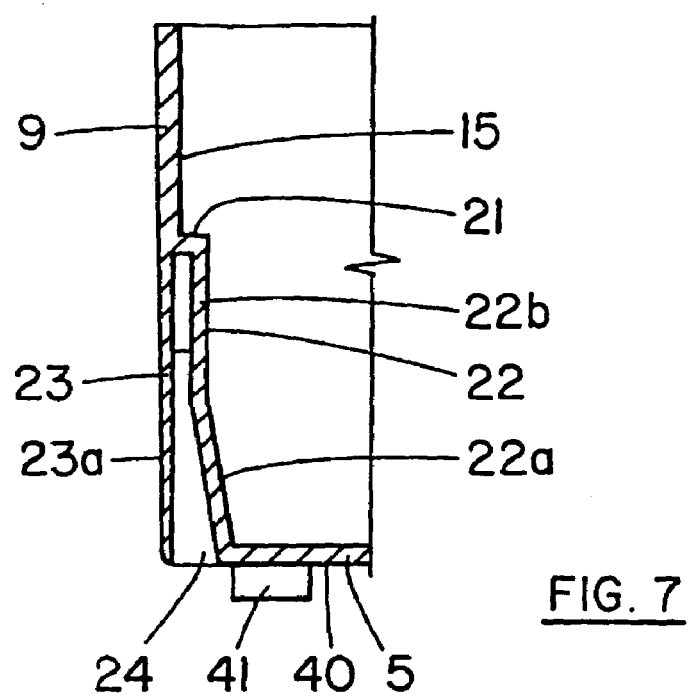
FIG. 7 is a is a cross section of the container section of FIG. 2 through line 7—7.

As shown in FIG. 7, to permit easy insertion of the magnet 14, the open end 24 of slot 18 is larger than the thickness of the magnet 14 and a first section 22a of the back wall 22 is sloped from the open end 24 of slot 18 at about a 10° angle until slot 18 is about 0.126 inches thick through a second section 22b of back wall 22. The portion 23a of the planar wall 9 that forms the front wall 23 of slot 18 also has its thickness tapered adjacent the open end 24 of slot 18.

In the embodiment shown, see FIGS. 4 to 6, a metal member 28 is secured to the inside surface 15 of planar wall 9 by means of slot 30 in the section 31 of planar wall 9 to the other side of indent section 10. Slot 30 is similar in configuration to slot 18. It has two opposing side walls 32, 33 an end wall 34 and back wall 35. The front wall 36 of slot 30 is provided by the adjacent portion of planar wall 9 of the container section 3, 4. The slot 30 has an open end 37 in base 5 to permit insertion of the metal member 28. The metal member is preferably a flat disk having a different diameter than magnet 14. In the embodiment shown magnet 14 has a diameter of one inch and is 0.125 inches thick. The metal member 28 has a diameter of 1.144 inches and thickness of 0.118 inches. The two opposing side walls 32, 33 of slot 30 converge from open end 37 towards end wall 34. The end wall 34, in the embodiment shown, is a circular segment slightly greater than a semi-circle. When the metal member 28 is inserted into slot 30, it snaps into place against end wall 34. The container section 3, 4 in the embodiment illustrated is preferably molded from a plastic material, preferably polystyrene. When the newly molded container sections are still "warm", the side walls 32, 33 of slot 30 are sufficiently flexible to permit metal member to be inserted into slot 30 and snapped into place against end wall 34. The distance between the ends 38, 39 of end wall 34 is less than the diameter of metal member 28. As the container section "cools" there is some slight contraction further locking the magnet 14 in place. The open end 37 of slot 30 is preferably 1.238 inches wide. As the container section "cools" there is some slight contraction further locking the metal member 28 in place. By having slots 18 and 30 with different dimensions, it prevents the magnet 14 from being inserted into slot 30 or the metal member 28 from being inserted in slot 18. When the two container sections 3, 4 are joined magnet 14 in one of said sections is opposite the metal member 28 in the other of said sections and the magnetic attraction between the magnet 14 and metal member 28 holds the two container sections together. A bead of silicone or other suitable material can, if desired, be placed in the open ends 24, 37 of slots 18, 30 to prevent any unwanted materials from getting into the slots.

On the bottom side 40 of base 5, legs 41, 42 are provided to raise the base 5 off the table surface. The legs 41 are preferably 0.5 inches in diameter and 0.193 inches in height. The leg 42 is preferably the same diameter as legs 41 (0.5 inches) but slightly shorter (0.193 inches in height) to ensure the planar walls of the container sections fit flush against each other when resting on a flat table. The-preferred number of legs 41 is three on each container section 3, 4 spaced equi-distant around curved wall 8 to give the container section balance and stability.

If the container is used to hold real flowers, it may be necessary to use some method of providing drainage so the roots of the plant material are not sitting in water. This can be accomplished by placing rocks or other material, such as drainage inset plate, in the bottom of the container sections to provide a reservoir for any excess water or drilling a drainage hole(s) in the base 5.

The principles of the present invention can be applied to containers having any shape or size or material of construction not just the circular design of the size shown in the Figures. The container can be square, oval, triangular or other form of polygon. Both container sections do not necessarily have to be, but preferably are, identical shapes. The magnetic means must be complementary on both container sections. The containers can be used for planting flowers or can be shaped to hold other items such as food, cutlery, condiments etc. The present-invention does not require in each case all of the possible methods to be employed to hold the container sections together. One or more methods or any combination thereof can be utilized. While the above description relates to the preferred embodiment, the container sections 3, 4 may be formed of any shape, square, rectangular, semi-elliptical, triangular etc. and all such configurations are intended to fall within the scope of the invention. Further the magnet means 13 can be other than as described for the preferred embodiment. For example the magnets can be strips as opposed to disks. Further the means of attaching the magnet means to the side wall of the container section can be varied. They can be secured by adhesives, molded into the wall or possibly mechanically fastened. Similarly the metal member can be any shape and secured in a variety of ways.

If hook connections (not shown) are provided to allow the attachment of a hanger when the container is used as a hanging basket, the hook connections are preferably set every 60 degrees around the circumference of the top edge 12 of curved wall 8. In this application to insure the container sections are held together, a connector may be inserted into passageway 11 to assist with retaining the container sections 3, 4 together. A string hanger connected to the hook connections will hold the container and provide the balance required to rest level in the air.

Figure 8:
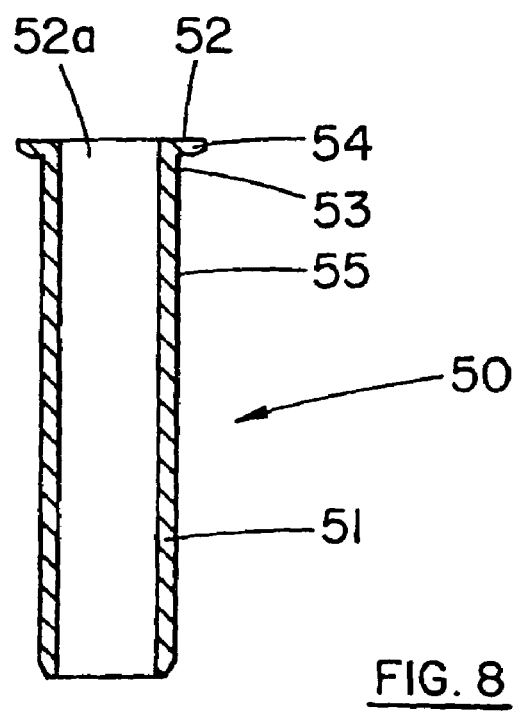
FIG. 8 is a side plan view, in cross section, of one embodiment of a centerpiece according to the present invention for use when the container rests on the patio table when the umbrella pole is not in use.
Figure 9:
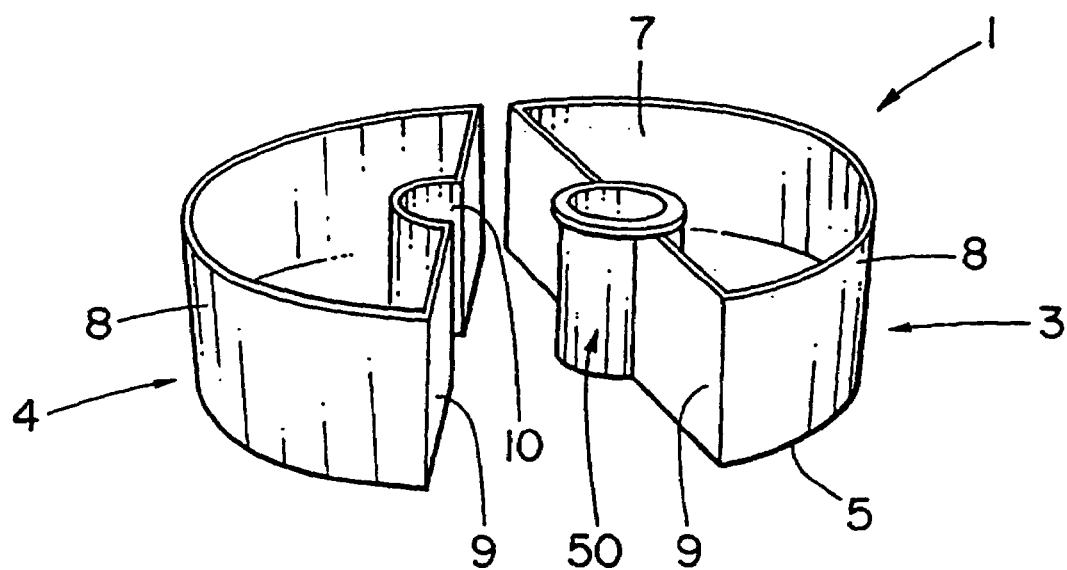
FIG. 9 is a perspective view of the container sections separated and showing placement of the centerpiece of FIG. 8.

When the preferred embodiment of the multi functional container system 1 fully assembled rests in the middle of a patio table without the umbrella pole it may be secured to the table using one embodiment of a center piece shown in FIGS. 8 and 9, generally indicated at 50, in accordance with the present invention. The center piece 50 consists of a tubular member 51 with a cap 52 on one end 53. The tubular member 51 can be formed of a relatively rigid plastic as shown in the Figures or maybe formed from a foam, wood, steel or other suitable material. The cap 52 of center piece 50 is designed to cover the passageway 11 formed by the semi-circular indent sections 10 of container sections 3, 4 where the umbrella pole would normally project. In the embodiment in FIG. 9, the cap 52 is a generally circular peripheral flange 54 extending perpendicular to the outer wall 55 of tubular member 51. To give greater stability to the assembled container system, a depending flange can be added at the outer edge of cap 52 and which would fit into notches or grooves on the top edge 12 of the planar wall 9. An advantage of the cap 52 being flat is has the ability to lie flat on the patio table when not in use. An opening 52A is centrally disposed in cap 52 to permit the cap to be lifted by a person's finger. Typically the home owner would place a finger in the opening 52A to lift the centerpiece 50 and then place the two container sections around it. The centerpiece may be left in the hole in the patio table until needed when the umbrella pole is not in place.

As noted above the center piece 50 is pushed down through passageway 11 and the hole 57 in the centre of the patio table 58 when the umbrella pole is not in use. The tubular member 51 has a diameter slightly less than that of the patio table centre hole 57.

Figure 10:
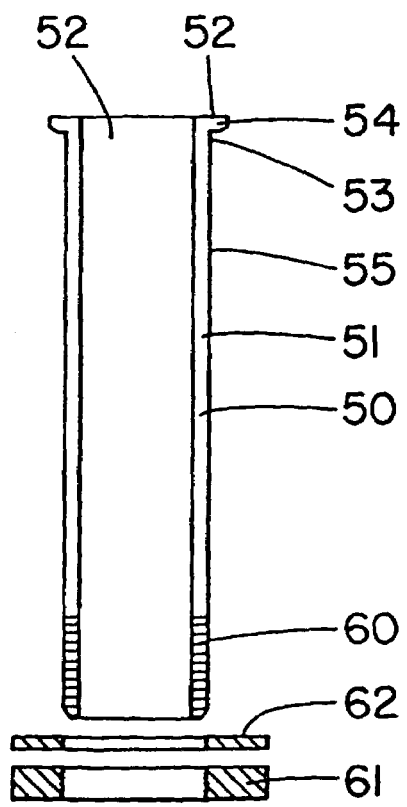
FIG. 10 is a side plan view, in cross section, of the centerpiece of FIG. 8 with additional connection means.

One end 59 of the tubular member 51 is attached to cap 52. Where greater security is desired the other end 60 of the tubular member 51 can be adapted to include connection means. As shown in FIG. 10 the connection means could be a simple as threading the end 60 of the tubular, member 51 and using a nut 61 and washer 62 as a connection means. More sophisticated arrangements are also possible. For example two diagonally opposite depending fingers can be attached to the end 60 of tubular member 51. The fingers would flex to permit them to pass through the hole in the centre of the patio table. Once the fingers have passed through the hole they are biased to spread open. The centerpiece is removed from the hole by squeezing the two fingers together under the patio table and pushing it back up through the hole.

In another aspect the scope of the present invention would include the multi-functional container system without the umbrella passageway. In order to permit the sections to be easily joined and separated magnetic means are provided as described above. In addition other attachment means such as clamps to fit over the top edges of both planar walls can be provided.

Other possible connection means are included within the scope of the invention.

Having illustrated and described a preferred embodiment of the invention and certain possible modifications thereto, it should be apparent to those of ordinary skill in the art that the invention permits of further modification in arrangement and detail.

It will be appreciated that the above description related to the preferred embodiment by way of example only. Many variations on the invention will be obvious to those knowledgeable in the field, and such obvious variations are within the scope of the invention as described and claimed, whether or not expressly described.

The embodiments of the invention in which an exclusive property or privilege is claimed are defined as follows:

1. A multifunctional container for use on an outdoor patio table, said patio table capable of having an umbrella pole inserted through a center hole in said patio table, said multifunctional container comprising two container sections, each having a base adapted to rest on the patio table, a generally planar side wall and at least one peripheral side wall, said planar side wall and peripheral side wall defining an enclosed space open at the top, said planar side wall having an indent section centered on said planar side wall and having a semi-circular cross section sized to fit around the umbrella pole which forms a vertical passageway when the planar side wall on each of said container sections are joined, said planar side walls on each container section having magnetic means to permit the container sections to be easily joined and separated, wherein the magnetic means consists of a one or more magnets located on the planar side walls of the container sections and one or more metal members secured to the planar side wall of each container section opposite the magnet on the planar side wall on the other container section, wherein said magnet is secured to an inside surface of the planar wall by means of a first vertical slot to one side of said indent section and said metal member is secured to the inside surface of the planar wall by means of a second vertical slot in the planar wall on a second side of the indent section from the first vertical slot.

2. A multifunctional container according to claim 1 wherein said first vertical and second vertical slots each have two opposing side walls, an end wall, front wall and back wall, wherein the front wall is provided by the adjacent portion of the planar wall of the container section.

3. A multifunctional container according to claim 2 wherein the first vertical slot has an open end in the bottom of the base of said container section to permit insertion of the magnet and the second vertical slot has an open end in the bottom of the base of said container section to permit insertion of the metal member.

4. A multifunctional container according to claim 3 wherein the magnet is a flat disk and the two opposing side walls of said first vertical slot converge from said open end towards the end wall of said first vertical slot.

5. A multifunctional container according to claim 4 wherein the two opposing side walls of said first vertical slot converge at about a 5° angle from the vertical and the end wall is a circular segment slightly greater than a semi-circle.

6. A multifunctional container according to claim 5 wherein when the magnet is inserted into the first vertical slot, it snaps into place against said end wall.

7. A multifunctional container according to claim 6 wherein the container sections are molded from a plastic material.

8. A multifunctional container according to claim 7 wherein the container sections are molded from polystyrene.

9. A multifunctional container according to claim 2 wherein the metal member is a flat disk having a different diameter than said magnet.

10. A multifunctional container according to claim 3 wherein the open end of the first and second vertical slots in the planar side walls are sealed after insertion of the magnet and metal member.

11. A multifunctional container according to claim 1 wherein said planar side walls of each of said container sections are held together by the magnetic attraction between the magnet in the planar side wall of one of said container sections and the metal member in the planar side wall of the other of said container sections.

12. A multifunctional container according to claim 1 wherein legs are provided on a bottom side of the base of each container section.

13. A multifunctional container according to claim 1 further comprising a centerpiece comprising a cap and a longitudinal depending section, said cap adapted to cover the passageway formed by the indent sections in said planar side wall of said container sections.

14. A multifunctional container according to claim 13 wherein the longitudinal depending section comprise a tubular member with a diameter slightly less than that of a patio table centre hole.

15. A multifunctional container according to claim 13 wherein connection means are attached to a distal end of the longitudinal depending section

* * * * *

UNITED STATES PATENT AND TRADEMARK OFFICE
CERTIFICATE OF CORRECTION

| | | |
|---|---|---|
| PATENT NO. | : 6,964,129 B2 | Page 1 of 1 |
| APPLICATION NO. | : 10/475926 | |
| DATED | : November 15, 2006 | |
| INVENTOR(S) | : Roy Fenwick | |

It is certified that error appears in the above-identified patent and that said Letters Patent is hereby corrected as shown below:

ON THE TITLE PAGE

At section (73), line 3, after the word "Assignee", delete "Dennison Associates, Toronto (CA)" and insert therefor --None--.

Signed and Sealed this

Fifteenth Day of August, 2006

JON W. DUDAS
*Director of the United States Patent and Trademark Office*

UNITED STATES PATENT AND TRADEMARK OFFICE
CERTIFICATE OF CORRECTION

PATENT NO. : 6,964,129 B2 Page 1 of 1
APPLICATION NO. : 10/475926
DATED : November 15, 2005
INVENTOR(S) : Roy Fenwick It is certified that error appears in the above-identified patent and that said Letters Patent is hereby corrected as shown below:

ON THE TITLE PAGE

At section (73), line 3, after the word "Assignee", delete "Dennison Associates, Toronto (CA)" and insert therefor --None--.

This certificate supersedes Certificate of Correction issued August 15, 2006.

Signed and Sealed this

Nineteenth Day of September, 2006

JON W. DUDAS
*Director of the United States Patent and Trademark Office*